United States Patent [19]
Smith et al.

[11] Patent Number: 5,161,919
[45] Date of Patent: Nov. 10, 1992

[54] BOTTLE AIR CONVEYOR

[75] Inventors: Paul W. Smith, Forest; Brian K. Hilbish, Beford, both of Va.

[73] Assignee: Simplimatic Engineering Company, Lynchburg, Va.

[21] Appl. No.: 741,108

[22] Filed: Aug. 6, 1991

[51] Int. Cl.⁵ ............................................. B65G 51/02
[52] U.S. Cl. ......................................... 406/86; 406/88
[58] Field of Search .................................... 406/86, 88

[56] References Cited

U.S. PATENT DOCUMENTS

| | | |
|---|---|---|
| 3,850,478 | 11/1974 | Hurd . |
| 3,953,076 | 4/1976 | Hurd . |
| 4,284,370 | 8/1981 | Danler et al. ........................ 406/86 |
| 4,724,035 | 2/1988 | Mann et al. ...................... 406/86 X |
| 4,822,214 | 4/1989 | Ardlin et al. .................... 406/88 X |
| 4,938,636 | 7/1990 | Aidlin et al. ..................... 406/86 X |
| 5,028,174 | 7/1991 | Karass . |
| 5,100,265 | 3/1992 | Mirkin ................................. 406/86 |

FOREIGN PATENT DOCUMENTS

| | | | |
|---|---|---|---|
| 344417 | 12/1989 | European Pat. Off. ............ 406/88 |
| 2580609 | 10/1986 | France .................................. 406/86 |
| 9010587 | 9/1940 | World Int. Prop. O. ............ 406/86 |

Primary Examiner—Johnny D. Cherry
Assistant Examiner—Gary C. Hoge
Attorney, Agent, or Firm—St. Onge Steward Johnston & Reens

[57] ABSTRACT

An air conveyor is provided for articles having outwardly extending flanges comprising a plenum chamber having a base portion, walls extending from said base portion to form a conveying channel, flange guides mounted to said walls for supporting articles beneath their flanges, and apertures in the walls beneath the flange guides for directing air from the plenum chamber toward the articles beneath the flanges.

A reduced friction flange guide which may be used with the air conveyor is also provided and comprises flange guides angled with respect to the flanges.

21 Claims, 8 Drawing Sheets 5,161,919

BOTTLE AIR CONVEYOR

FIELD OF THE INVENTION

This invention relates to a conveyor for articles such as bottles having an outwardly extending flange or neck ring. More specifically, this invention relates to a bottle conveyor which directs air onto the bottles beneath their neck rings and to a reduced friction neck guide which may be used in a bottle conveyor.

BACKGROUND ART

Several air systems having various features are generally known for conveying bottles. U.S. Pat. No. 4,283,370 to Danler comprises a plurality of air slots or jets, in vertically oriented conveying channel side walls, for issuing air impinging on neck portions of the bottles.

U.S. Pat. No. 4,822,214 to Aidlin comprises a plurality of air directing louvers in the top and side walls of an inverted, U-shaped interior channel which receives the neck portion of a container. The louvers convey the container in the direction of the air flow and fill the container with air.

Designs such as these which provide air jets disposed above the neck tracks, or otherwise convey bottles by directing air toward the bottles at a location above their neck rings, are disadvantageous since contaminants in air from the plenum may be introduced into the bottles. This disadvantage may be exacerbated in a design requiring that a relatively large bottle be conveyed by directing air substantially only at a relatively small neck portion of the bottle since conveying such a bottle may necessitate relatively high air pressures. A further disadvantage is friction which may develop between the neck tracks of a conveyor and the neck rings of bottles, requiring increased air pressure to convey bottles and reducing system efficiency. Increases in the air pressure required to convey bottles may lead to increases in the contamination of bottles by plenum air.

SUMMARY OF THE INVENTION

Accordingly, it is an object of this invention to provide an air conveyor for articles such as bottles which is relatively efficient in operation.

Another object of the invention is to provide an air conveyor which aids in reducing bottle contamination.

A further object of the invention is to provide an air conveyor of the above character which does not direct air substantially toward a neck portion of bottles.

Yet another object of the invention is to provide an air conveyor of the above character which directs air beneath the neck rings of bottles.

A still further object of the invention is to provide an air conveyor of the above character which directs air substantially toward a shoulder portion of bottles.

Still another object of the invention is to provide reduced friction neck guides which may be used in an air conveyor of the above character.

A yet still further object of the invention is to provide an air conveyor of the above character having reduced friction neck flange guides.

Other objects of the invention will be obvious and may in part appear hereinafter.

These and other objects are achieved by provision of an air conveyor for bottles having neck rings comprising a plenum chamber having a base portion, walls extending from said base portion to form a conveying channel, neck guides mounted to said walls for supporting bottles beneath their neck rings, and a plurality of apertures in the walls beneath the neck guides for directing air from the plenum chamber onto the bottles beneath their neck rings. The conveying channel may be inverted and substantially V-shaped or the walls may slope away from the bottles beneath the neck guides. The plurality of apertures may be arrayed in the walls in a plurality of rows of at least one aperture.

A reduced friction neck guide which may be used with the air conveyor is also provided and comprises neck guides mounted at an angle to the base portion of the plenum chamber such that neck rings of bottles rest on the neck guides substantially in a point contact.

The invention and its particular features will become more apparent from the following detailed description considered with reference to the accompanying drawings.

DETAILED DESCRIPTION OF THE INVENTION

Figure 1:
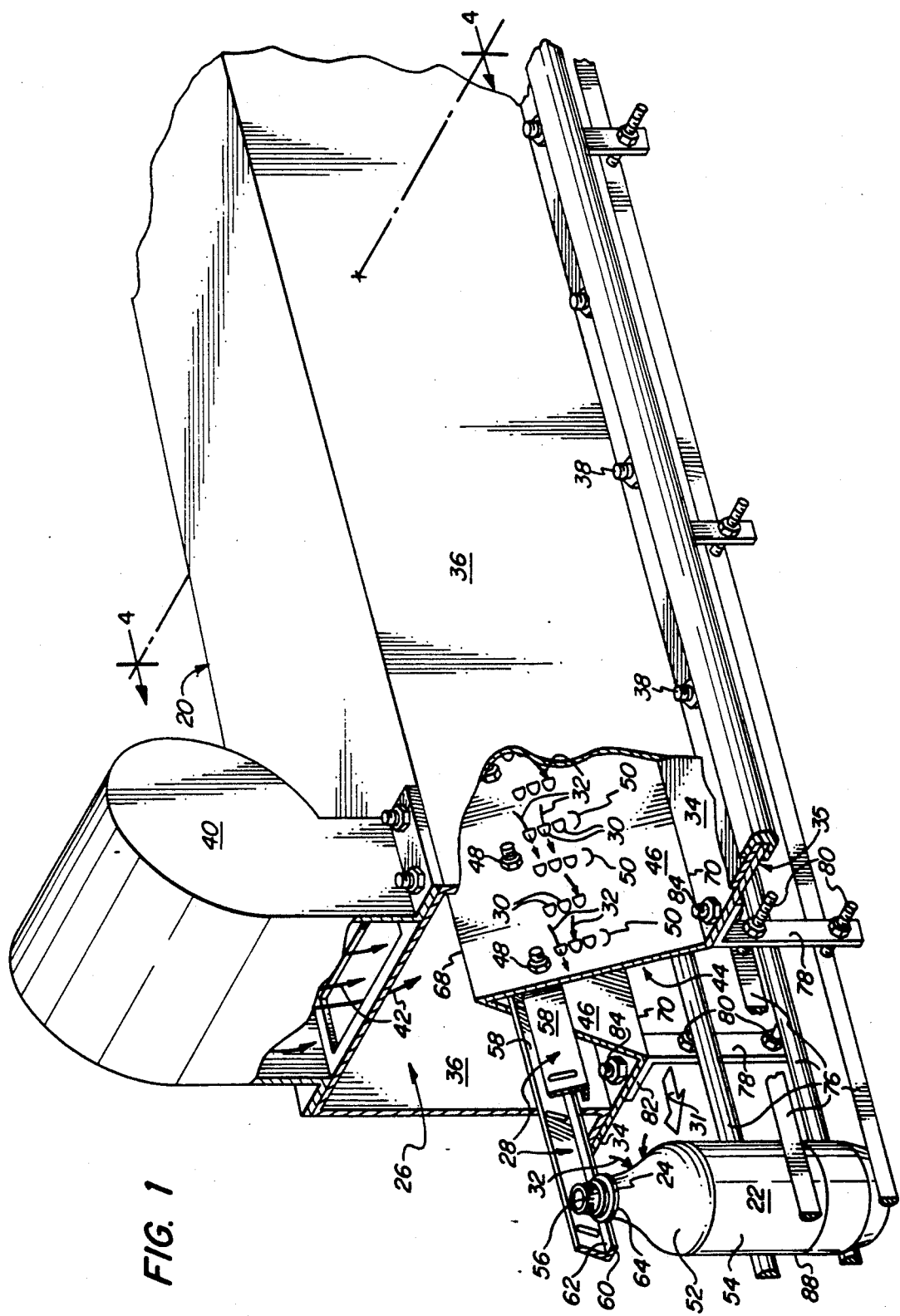
FIG. 1 is a front isometric view of one embodiment of an air conveyor for bottles having neck rings in accordance with the invention.
Figure 4:
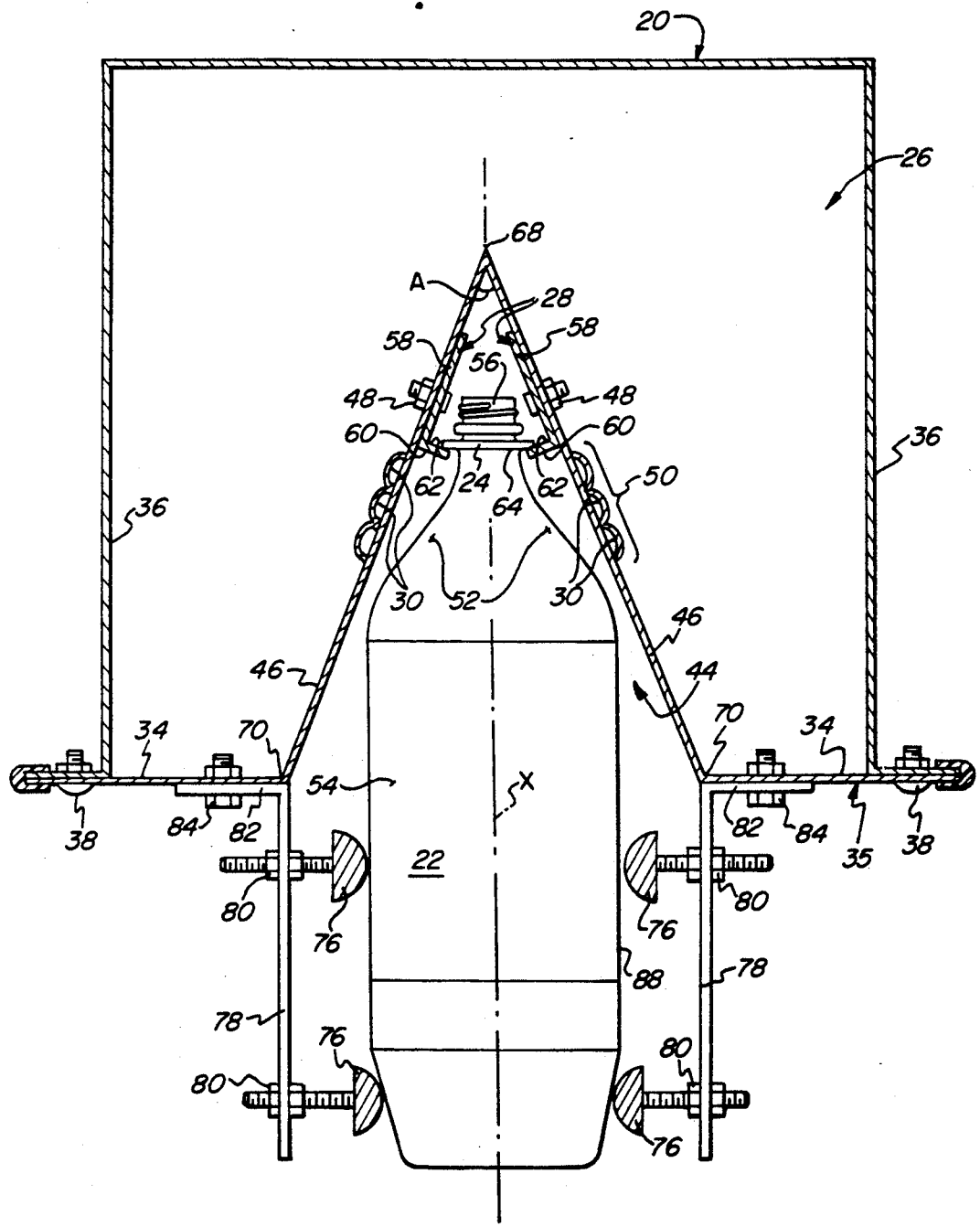
FIG. 4 is an end cross-sectional view of the air conveyor of FIG. 1 taken along plane 4—4 in FIG. 1.
Figure 7:
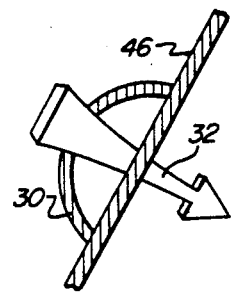
FIG. 7 is an enlarged partial cross-sectional view of the channel wall of the air conveyor of FIG. 1 taken along plane 7—7 in FIG. 6.

Referring to FIGS. 1 and 4, an air conveyor 20 in accordance with the invention is generally shown in front isometric and end cross-sectional views. Air conveyor 20 is designed for conveying articles, such as bottles 22, having outwardly extending flanges, such as neck rings 24. Air conveyor 20 generally comprises a plenum chamber 26, neck guides or tracks 28 for supporting bottles 22 beneath their neck rings 24, and a plurality of apertures 30 for conveying bottles 22 in the direction of arrow 31. Air is directed from plenum chamber 26 through apertures 30 toward bottles 22 as indicated by arrows 32 (FIGS. 1 and 7 only).

Plenum chamber 26 comprises a base portion 34 at its base 35, and an upper wall portion 36. Base portion 34 and upper wall portion 36 at least partially enclose plenum chamber 26 and are fastened together by means such as nut and bolt combinations 38. One or more blowers 40 or the like pressurize plenum chamber 26 with air as indicated by arrows 42 (FIG. 1 only).

Bottles 22 are conveyed along a channel 44 formed by and between opposing walls 46 extending, preferably upwardly, from base 35 of plenum chamber 26. By "upwardly" is meant substantially away from base 35. Neck guides 28 for supporting bottles 22 are mounted to opposing walls 46 with nut and bolt combinations 48 or the like. Preferably, neck guides 28 are mounted within channel 44.

Air directing apertures 30 are preferably located in walls 46 at a position beneath neck guides 28. By "beneath neck guides" is meant on a side of neck guides 28 beneath neck rings 24 on bottles 22. Apertures 30 are preferably arrayed in walls 46 in a plurality of rows 50 of at least one, more preferably at least two, and most preferably three apertures each. Apertures 30 are preferably disposed in walls 46 so as to substantially direct air toward bottles 22 at a position beneath their neck rings 24, and most preferably toward their shoulder portions 52.

Shoulder portions 52 of bottles 22 extend between neck rings 24 and body portions 54 of bottles 22. Body portion 54 is generally that portion of bottles 22 including the greatest girth. Shoulder portion 52 generally tapers from body portion 54 to neck ring 24. A neck portion 56 or "finish" of bottles 22 is that portion of bottles 22 extending above neck rings 24. Neck portion 56 is generally the outer portion of bottles 22 most important to keep sanitary. Neck portion 56 may include threads or the like to aid in filling the bottle or to receive a cap or other seal (not shown in any Figure).

Figure 3:
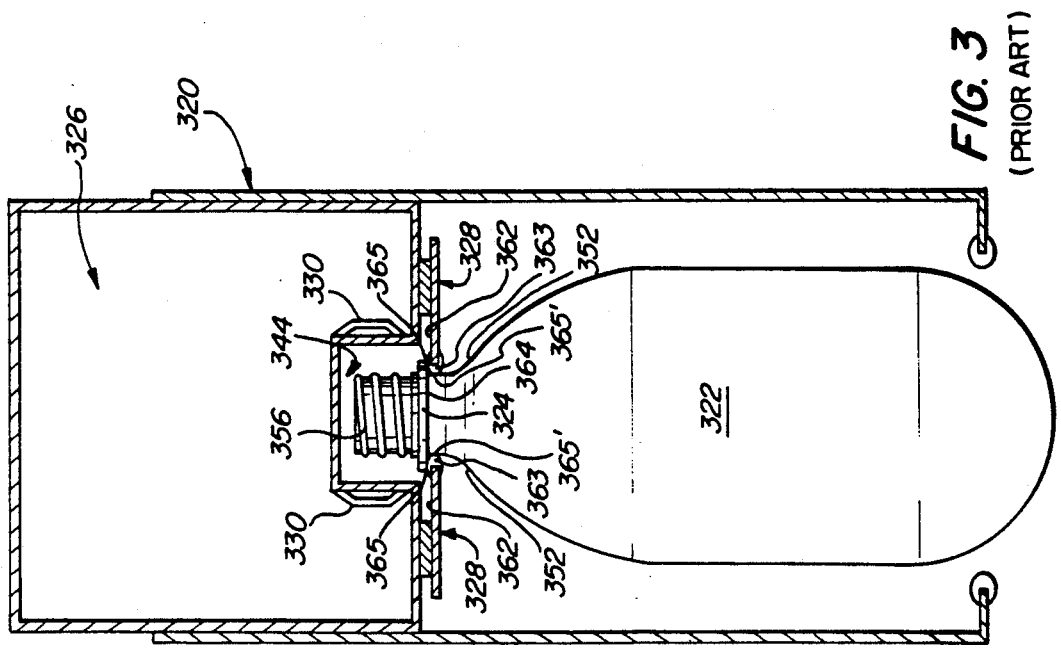
FIGS. 2 and 3 are end cross-sectional views of conveyor systems for bottles having neck rings which are prior art to the air conveyor of FIG. 1.
Figure 2:
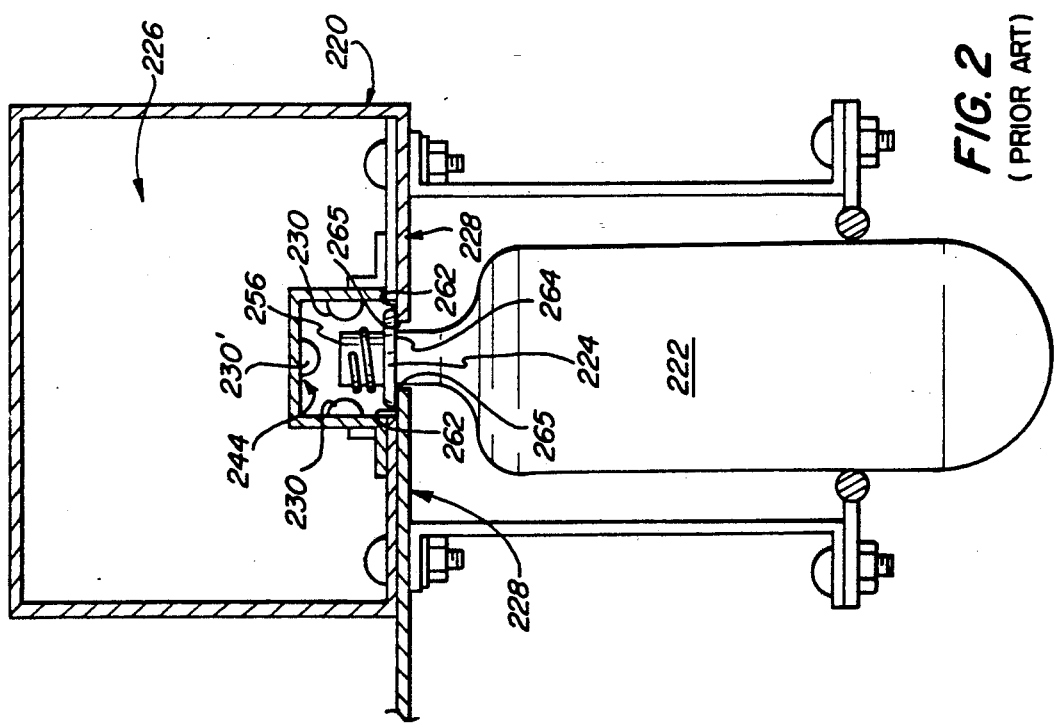

Referring now to FIGS. 2 and 3, apertures 230, 330 in respective prior art bottle air conveyors 220, 320 are only located above neck guides 228, 328. Further, prior art apertures 230, 330 direct air from plenum chambers 226, 326 substantially only at neck portions 256, 356 or above neck rings 224, 324 of bottles 222, 322. These prior art conveyors disadvantageously convey bottles by directing air, which may include contaminants, at the portions of bottles which are most important to keep sanitary. Further, aperture 230' directs air which may include contaminants into bottles 222.

Returning now to FIGS. 1 and 4, apertures 30 of conveyor 20 do not direct air at neck portion 56 but substantially only beneath neck rings 24 of bottles 22. By directing air substantially at shoulder portions 52 of bottles 22, apertures 30 also effectively convey bottles 22 without unnecessarily rocking them back and forth along the direction of arrow 31 (FIG. 1 only).

Referring now to FIG. 4, walls 46 preferably converge at an angle A of between about 30 and 90 degrees, and most preferably between about 45 and 60 degrees, as they extend toward neck guides 28. That is, walls 46 preferably slope away from an axis X of bottles 22 as they extend downwardly from neck guides 28. By "downwardly" is meant substantially toward base 35. Walls 46 preferably also converge, or otherwise lie, in substantial proximity with shoulder portions 52 of bottles 22. In this regard, apertures 30 are also preferably disposed in substantial proximity with shoulder portions 52 of the bottles in order to improve conveying efficiency.

Figure 9:
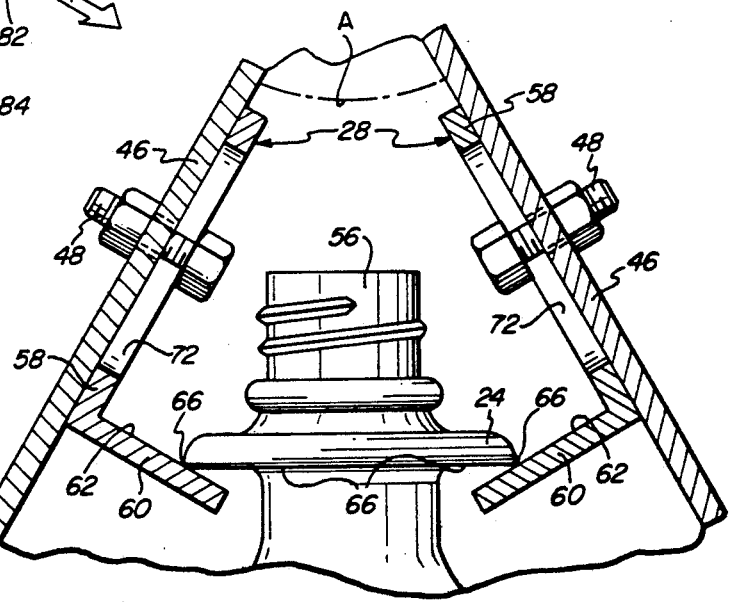
FIG. 9 is an enlarged partial end cross-sectional view of the air conveyor of FIG. 1 depicting point contact between the neck guides and neck rings of bottles.

Referring to FIGS. 1, 4 and 9, neck guides 28 comprise a mounting arm 58 and a support arm 60. Support arm 60 includes a support surface 62 for contacting neck rings 24 to support bottles 22. Support surfaces 62 extend inwardly from walls 46, and are preferably also angled downwardly to receive a lower surface 64 of neck rings 24 substantially in a point contact at 66.

Referring again to FIGS. 3 and 2, prior art neck guides 328, 228 are not located in channel 344, 244 of respective prior art bottle air conveyors 320, 220. Neck guides 328 include support surfaces 362 having wearstrips 363 or the like attached thereto which receive a lower surface 364 of neck rings 324 in a relatively high friction line or surface contact at 365. Wearstrips 363 may also receive shoulder portions 352 of bottles 322 in an additional point contact at 365'. Neck guides 228 include support surfaces 262 which receive lower surfaces 264 of neck rings 224 in a relatively higher friction surface contact at 265.

Returning to FIGS. 1, 4 and 9, by downwardly angling support surfaces 64 of neck guides 28, frictional contact between lower surface 66 of neck rings 24 and support surfaces 62 of neck guides 28 is reduced, and bottles 22 may thus be conveyed more efficiently.

Preferably, walls 46 continue to converge or slope to a point beyond neck guides 28, and most preferably converge toward an apex 68. In this regard, channel 44 is an inverted, substantially "V"-shaped channel. In embodiments of conveyor 20 where walls 46 converge beyond neck guides 28, support surfaces 62 preferably extend substantially perpendicularly from walls 46. Angle A preferably ranges between about 30 and 90 degrees depending upon the size of bottles 22 to be conveyed.

Walls 46 and base portion 34 of plenum chamber 26 may, but need not be, conveniently provided as a unitary, one-piece construction. In this regard, base portion 34 and walls 46 may, but need not be, formed from a single sheet of material by bending it three or more times. For example, bends at 70 may delimit base portion 34 from walls 46, and a third bend may form apex 68 or the like. It is understood that, in other embodiments, two or more bends may replace apex 68. It is also understood that walls 46 and base portion 34 of plenum 26 may also be provided as two or more pieces which may be connected together by welding or the like, for example at apex 68.

Figure 5:
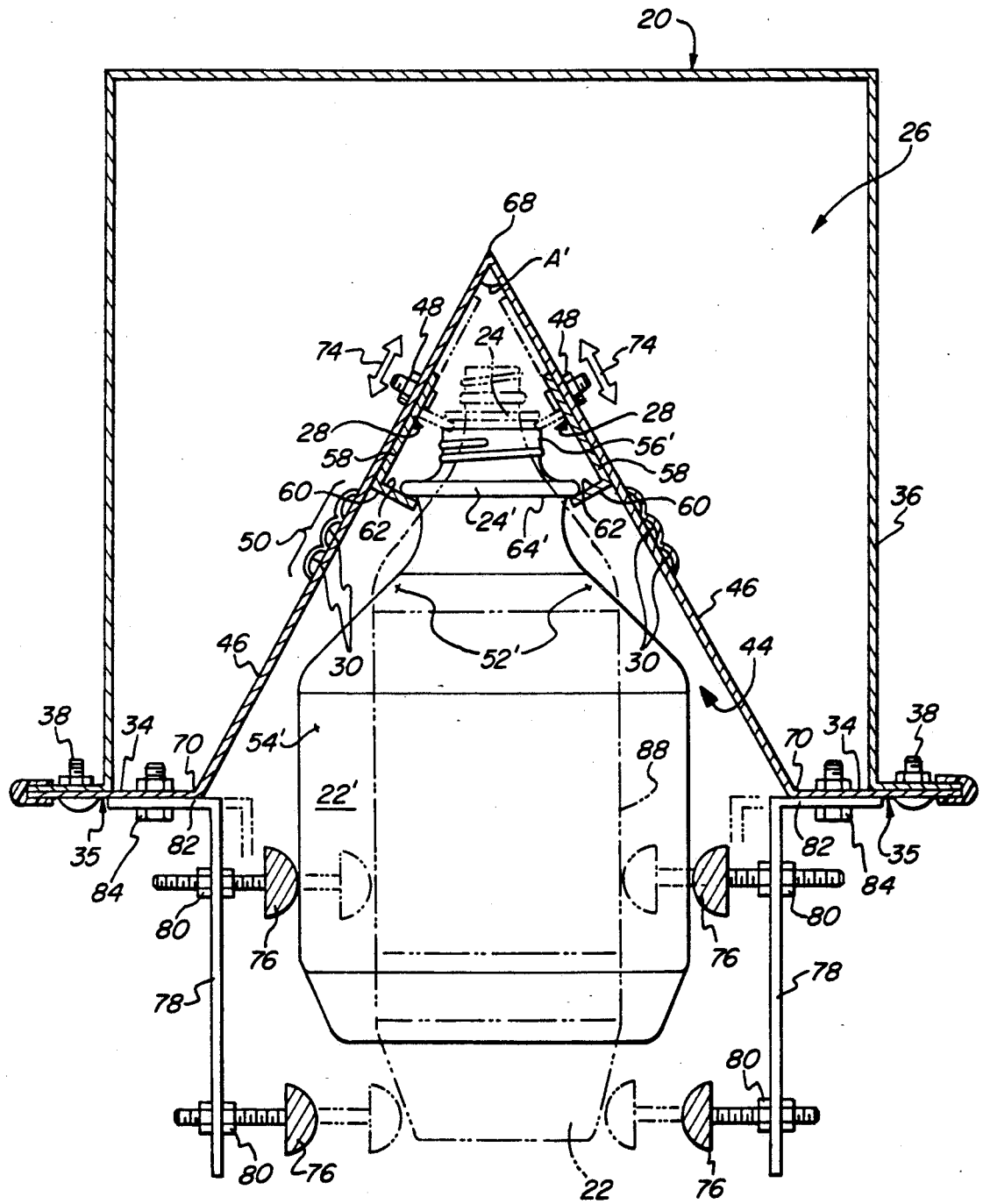
FIG. 5 is an end cross-sectional view of an air conveyor in accordance with the embodiment of FIG. 1 but having a wider conveying channel.
Figure 6:
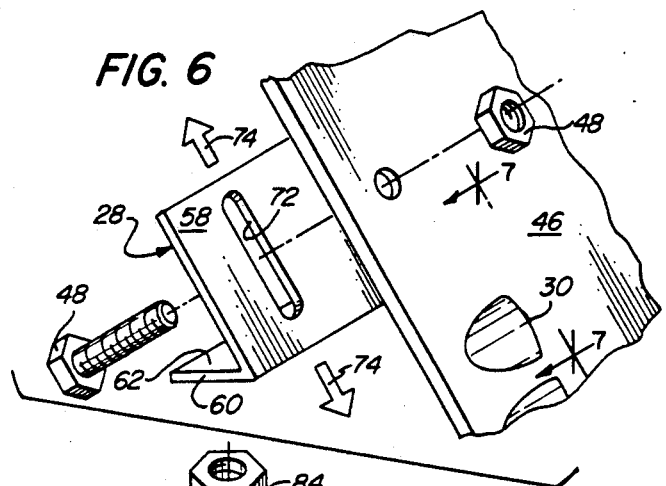
FIG. 6 is an enlarged exploded partial front isometric view of the air conveyor of FIG. 1 revealing the adjustability of the neck guides.

Referring now to FIGS. 4, 5 and 6, several means for accommodating different size bottles 22, 22' with conveyor 20 are illustrated. First, mounting arms 58 of neck guides 28 include mounting slots 72 (FIG. 6 only) permitting neck guides 28 to be adjustably mounted to walls 46 for movement in the direction of arrows 74. Adjustment of neck guides 28 along converging sections of opposing walls 46 moves support surfaces 62 closer together and farther apart enabling bottles having various size neck rings 24, 24' to be accommodated by conveyor 20. For example, a single set of neck guides 28 is shown spaced relatively far apart to receive neck ring 24' and support bottle 22', and is also shown in dashed lines spaced less far apart to receive neck ring 24 and support bottle 22.

Second, and generally only upon installation, angle A may be provided with virtually any acute magnitude necessary to accommodate a bottle or series of bottles to be conveyed. For purposes of illustration only, angle A' in FIG. 5 is shown slightly larger than angle A in FIG. 4. It is understood, that because of the adjustability of neck guides 28, bottles 22 may be accommodated by walls 46 converging at either angle A or A'.

Figure 8:
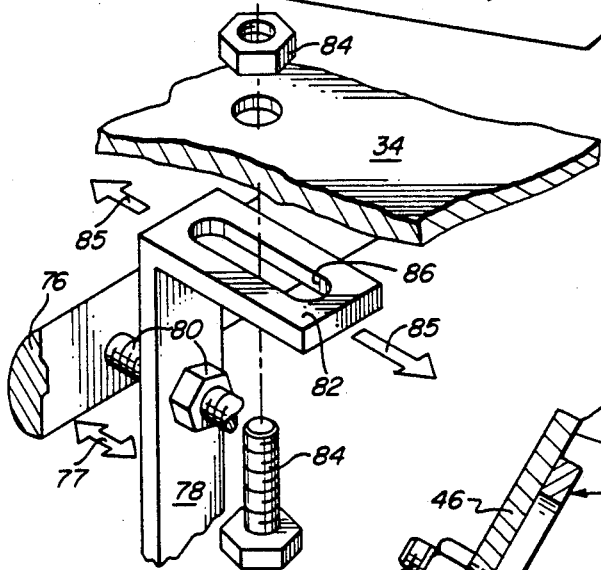
FIG. 8 is an enlarged exploded partial front isometric view of the air conveyor of FIG. 1 revealing the adjustability of the bottle guides.

Referring now to FIGS. 1, 4, 5 and 8, conveyor 20 also includes bottle or article guides 76 mounted for adjustment in the direction of arrow 77 (FIG. 8 only) to brackets 78 by nut and bolt combination 80. Bracket 78 is adjustably fastened by slotted arm 82 to base portion 34 of plenum chamber 26 with a nut and bolt combination 84. It this regard, bracket 78 may be adjusted in the direction of arrows 85 by sliding bolt 84 along slot 86 (FIG. 8 only). By adjusting both bracket 78 along slot 86 and bottle guides 76 from bracket 78, bottle guides 76 can be arranged to substantially match varying silhouettes 88, 88' of bottles 22, 22' and the like, and aid in preventing the bottles from swinging side to side during conveying (see FIG. 5).

Figure 10:
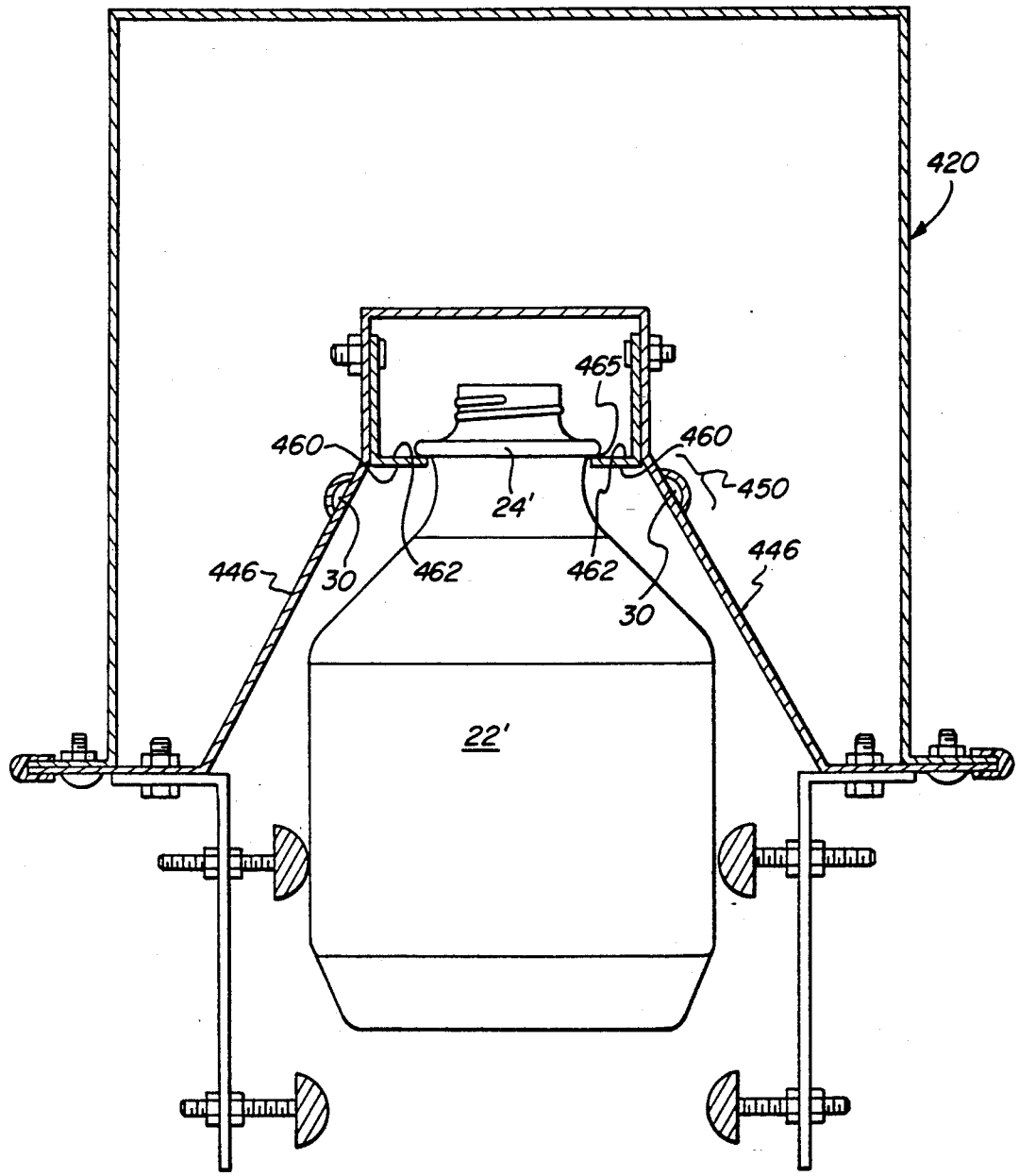
FIGS. 10 through 12 are end cross-sectional views of additional embodiments of an air conveyor in accordance with this invention depicting various neck guide, channel wall, and aperture arrangements.
Figure 11:
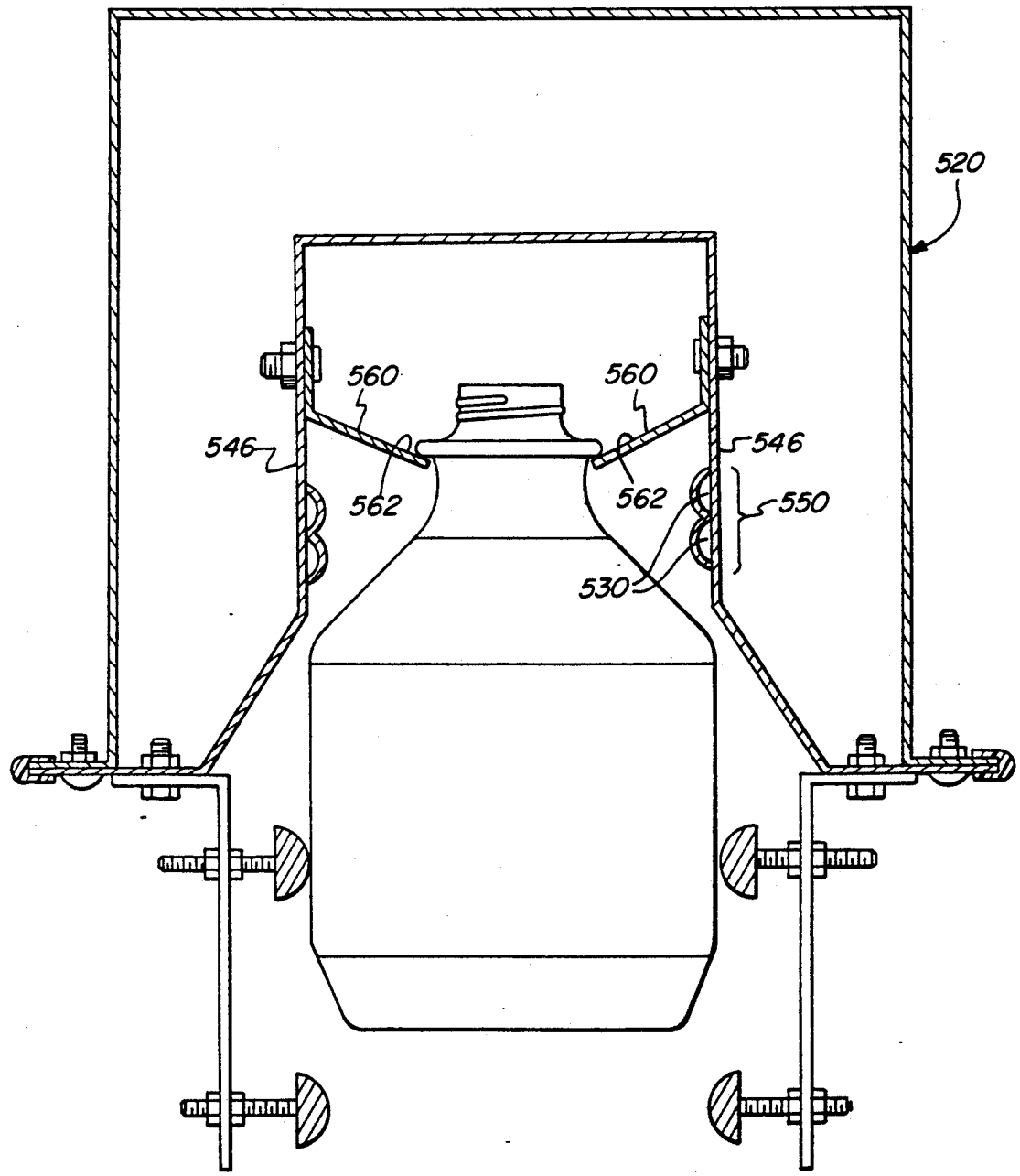
Figure 12:
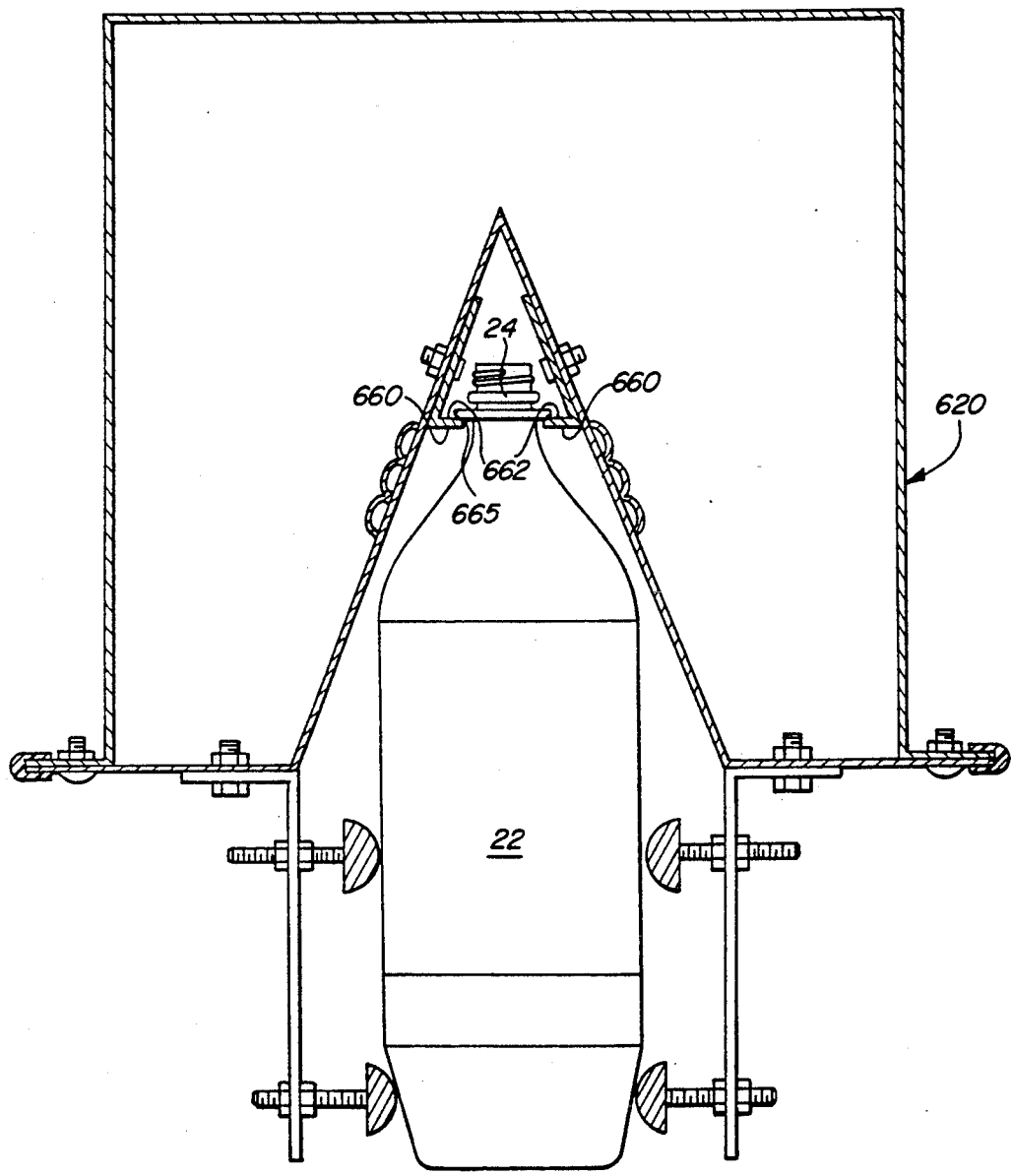

Referring now to FIGS. 10 through 12, other embodiments 420, 520, 620 of air conveyor 20 in accordance with the invention are illustrated. Conveyors 420, 620 include support arms 460, 660 which receive neck rings 24', 24 substantially in a surface contact 465, 665 to support bottles 22', 22. Conveyor 420 includes a plurality of rows 450 of one aperture 30, while conveyor 520 includes a plurality of rows 550 of two apertures 530.

Conveyors 420, 520 include opposing walls 446, 546 which converge in a direction toward support arms 460, 560. In conveyor 420, walls 446 converge substantially up to support arms 460 and apertures 30 are disposed in these converging sections. In conveyor 520, however, walls 546 converge only for a relatively short distance toward support arms 560, and apertures 530 are in substantially non-converging sections of walls 546.

Although the invention has been described with reference to particular arrangements of parts, particular features, and the like, these are not intended to exhaust all possible parts arrangements or features, and indeed many other modifications and variations will be ascertainable to those of skill in the art.

What is claimed is:

1. An air conveyor for articles having outwardly extending flanges comprising:
   a plenum chamber having a base;
   converging channel walls extending from said base to form an inverted, substantially V-shaped channel;
   flange guides fastened to said converging channel walls for supporting articles beneath the flanges, said flange guides disposed at an angle to said base such that the flanges rest on said flange guides substantially in a point contact to reduce friction;
   a plurality of apertures in said converging channel walls beneath said flange guides for directing air from said plenum chamber onto said articles beneath the flanges to move the articles along said channel.

2. The air conveyor of claim 1 wherein said flange guides substantially perpendicularly extend from said converging channel walls.

3. The air conveyor of claim 1 wherein said flange guides are adjustably fastened to said converging channel walls in order to support articles having various flange sizes.

4. The air conveyor of claim 1 comprising article guides adjustable to match a silhouette of a body portion of the articles and substantially prevent the articles from swinging side to side.

5. The air conveyor of claim 1 wherein said plurality of apertures are arrayed in said converging channel walls in a plurality of rows of at least two apertures.

6. The air conveyor of claim 1 wherein said articles are bottles, and wherein said plurality of apertures are disposed in said converging channel walls so as to direct air substantially at a shoulder portion of the bottles.

7. The air conveyor of claim 6 wherein said channel walls converge at an angle of between abut 30 and 90 degrees in substantial proximity with a shoulder portion of the bottles.

8. The air conveyor of claim 1 wherein said channel walls converge at an angle of between about 45 and 60 degrees.

9. In an air conveyor for bottles having neck rings wherein said bottles are slidingly supported by said neck rings upon neck guides and wherein a plurality apertures in a wall of a plenum chamber direct air from said plenum chamber toward said bottles to move said bottles along said neck guides, the improvement wherein said plurality of apertures are arrayed in said plenum chamber wall substantially only below said neck guides, and said plurality of apertures are disposed in said plenum chamber wall to direct air at said bottles substantially only beneath said neck rings, whereby the incidence of contaminants from said plenum chamber entering said bottles may be reduced, and wherein said neck guides are angled downwardly such that said neck rings of said bottles rest on said neck guides substantially in a point contact to reduce friction.

10. The improved air conveyor of claim 9 wherein said plenum chamber wall slopes away from said bottles beneath said neck guides.

11. The improved air conveyor of claim 10 wherein said sloping plenum chamber wall is disposed in substantial proximity with a shoulder portion of the bottles.

12. The improved air conveyor of claim 9 wherein said plurality of apertures are arrayed in said plenum chamber wall in rows of at least one aperture.

13. The improved air conveyor of claim 9 wherein said apertures are disposed in said plenum chamber wall so as to direct air substantially at a shoulder portion of said bottles.

14. In an air conveyor for bottles having neck rings wherein said bottles are slidingly supported by said neck rings upon neck guides and wherein a plurality apertures in walls of a plenum chamber direct air from said plenum chamber toward said bottles to move said bottles along said neck guides, the improvement wherein said neck guides are mounted to said plenum chamber walls and said neck guides are angled slightly downwardly such that said neck rings of said bottles rest on said neck guides substantially in a point contact to reduce friction and improve conveying efficiency.

15. The improved air conveyor of claim 14 wherein said converging neck guides are adjustably mounted to said plenum chamber walls in order to support bottles having various neck ring sizes.

16. The improved air conveyor of claim 14 wherein said neck guides substantially perpendicularly extend from said plenum chamber walls.

17. An air conveyor for bottles having neck rings comprising:
   a plenum chamber having a base portion;
   walls extending from said base portion to form a conveying channel;
   neck guides mounted to said walls, said neck guides having support surfaces extending inwardly toward each other from said walls, said surfaces for receiving said neck rings to support said bottles; and
   a plurality of apertures in said opposing walls beneath said neck guides for directing air from said plenum chamber toward a shoulder portion of said bottles to move said bottles through said conveying channel;

said walls substantially converging from said base portion of said plenum chamber toward said neck guides, and said surfaces of said neck guides substantially perpendicularly extending from said converging walls.

18. The air conveyor of claim 17 wherein said support surfaces of said neck guides are disposed at a slight angle to said base portion of said plenum chamber such that said support surfaces of said bottles rest on said neck guides substantially in a point contact.

19. The air conveyor of claim 17 wherein said neck guides are adjustably fastened to said converging walls in order to support bottles having various neck ring sizes.

20. The air conveyor of claim 17 wherein said plurality of apertures are arrayed in said converging walls in a plurality of rows of at least one aperture.

21. The air conveyor of claim 17 wherein said walls converge at an angle in substantial proximity with said shoulder portion of said bottles.

* * * * *